(12) United States Patent
Mustafa et al.

(10) Patent No.: US 12,254,889 B2
(45) Date of Patent: Mar. 18, 2025

(54) METHOD, APPARATUS AND SYSTEM FOR HYBRID SPEECH SYNTHESIS

(71) Applicant: DOLBY INTERNATIONAL AB, Amsterdam Zuidoost (NL)

(72) Inventors: Ahmed Mustafa, Erlangen Bayer (DE); Arijit Biswas, Schwaig bei Nuremberg (DE)

(73) Assignee: DOLBY INTERNATIONAL AB, Amsterdam Zuidoost (NL)

( * ) Notice: Subject to any disclaimer, the term of this patent is extended or adjusted under 35 U.S.C. 154(b) by 0 days.

(21) Appl. No.: 17/419,047

(22) PCT Filed: Dec. 20, 2019

(86) PCT No.: PCT/EP2019/086656
§ 371 (c)(1),
(2) Date: Jun. 28, 2021

(87) PCT Pub. No.: WO2020/141108
PCT Pub. Date: Jul. 9, 2020

(65) Prior Publication Data
US 2022/0059107 A1 Feb. 24, 2022

Related U.S. Application Data

(60) Provisional application No. 62/787,831, filed on Jan. 3, 2019.

(30) Foreign Application Priority Data

Jan. 3, 2019 (EP) ..................................... 19150154

(51) Int. Cl.
*G10L 25/30* (2013.01)
*G10L 13/047* (2013.01)
(Continued)

(52) U.S. Cl.
CPC ............ *G10L 19/08* (2013.01); *G10L 13/047* (2013.01); *G10L 19/032* (2013.01); *G06N 3/08* (2013.01)

(58) Field of Classification Search
CPC ............ G06N 3/045; G06N 3/04; G06N 3/08
See application file for complete search history.

(56) References Cited

U.S. PATENT DOCUMENTS 8,706,480 B2 * 4/2014 Herre ...................... G10L 19/20
704/221
8,990,094 B2 3/2015 Krishnan
(Continued)

FOREIGN PATENT DOCUMENTS

CN 1321297 C 6/2007
CN 101971251 B 8/2012
(Continued)

OTHER PUBLICATIONS

Bollepalli, B. et al "Generative Adversarial Network-Based Glottal Waveform Model for Statistical Parametric Speech Synthesis" Interspeech, Aug. 20, 2017, pp. 3394-3398.
(Continued)

*Primary Examiner* — Jakieda R Jackson (57) ABSTRACT

A method of decoding an original speech signal for hybrid adversarial-parametric speech synthesis comprising: (a) receiving quantized original linear prediction coding parameters estimated by applying linear prediction coding analysis filtering to an original speech signal and a quantized compressed representation of a residual of the original speech signal; (b) dequantizing the original linear prediction coding parameters and the compressed representation of the residual; (c) inputting the dequantized compressed representation of the residual into a decoder part of a Generator for applying adversarial mapping from the compressed residual domain to a fake (first) signal domain; (d) output-
(Continued)

ting, by the decoder part of the Generator, a fake speech signal; (e) applying linear prediction coding analysis filtering to the fake speech signal for obtaining a corresponding fake residual; (f) reconstructing the original speech signal by applying linear prediction coding cross-synthesis filtering to the fake residual and the dequantized original linear prediction coding analysis parameters.

13 Claims, 3 Drawing Sheets

(51) Int. Cl.
*G10L 19/032* (2013.01)
*G10L 19/08* (2013.01)
*G06N 3/08* (2023.01)

(56) References Cited

U.S. PATENT DOCUMENTS

| | | | |
|---|---|---|---|
| 9,653,093 B1 | 5/2017 | Matsoukas | |
| 10,068,557 B1 | 9/2018 | Engel | |
| 10,971,142 B2* | 4/2021 | Sriram | G10L 15/20 |
| 2004/0024593 A1 | 2/2004 | Tsuji | |
| 2004/0153313 A1* | 8/2004 | Aubauer | G10L 21/038 |
| | | | 704/E21.009 |
| 2005/0171771 A1 | 8/2005 | Yasunaga | |
| 2007/0033023 A1* | 2/2007 | Sung | G10L 19/24 |
| | | | 704/E19.044 |
| 2008/0040104 A1 | 2/2008 | Ide | |
| 2008/0294429 A1* | 11/2008 | Su | G10L 19/20 |
| | | | 704/E19.042 |
| 2011/0077940 A1* | 3/2011 | Vos | G10L 19/005 |
| | | | 704/229 |
| 2011/0202355 A1* | 8/2011 | Grill | G10L 19/18 |
| | | | 704/E21.001 |
| 2013/0030798 A1* | 1/2013 | Mittal | G10L 19/20 |
| | | | 704/219 |
| 2013/0246055 A1* | 9/2013 | Gao | G10L 19/26 |
| | | | 704/205 |
| 2015/0051905 A1* | 2/2015 | Gao | G10L 19/125 |
| | | | 704/207 |
| 2015/0371653 A1* | 12/2015 | Pilli | G10L 21/0364 |
| | | | 704/206 |
| 2016/0232440 A1 | 8/2016 | Gregor | |
| 2018/0082679 A1 | 3/2018 | McCord | |
| 2018/0233127 A1 | 8/2018 | Visser | |
| 2018/0336464 A1 | 11/2018 | Karras | |
| 2018/0336880 A1 | 11/2018 | Arik | |
| 2018/0342258 A1 | 11/2018 | Huffman | |
| 2019/0197670 A1* | 6/2019 | Ferrer | G06V 10/764 |
| 2020/0098139 A1* | 3/2020 | Kaplanyan | G06N 3/048 |

FOREIGN PATENT DOCUMENTS

| | | |
|---|---|---|
| CN | 101849258 B | 11/2012 |
| CN | 107945811 B | 6/2021 |
| CN | 108352166 B | 10/2022 |
| JP | 2006350373 A | 12/2006 |

OTHER PUBLICATIONS

Gao, Y. et al "Voice Impersonation Using Generative Adversarial Networks" IEEE International Conference on Acoustics, Speech, and Signal Process, v. 2018, Sep. 10, 2018, pp. 2506-2510.
H.-S. Kim, \Linear Predictive Coding is All-Pole Resonance Modeling., https://ccrma.stanford.edu/ hskim08/lpc.
I. Goodfellow, et al., \Generative Adversarial Nets, in Advances in neural information processing systems, pp. 2672 (2680. 2014.
Juvela, L. et al "waveform Generation for Text-to-Speech Synthesis Using Pitch-Synchronous Multi-Scale Generative Adversarial Networks" arxiv.org, Oct. 30, 2018, pp. 1-3.
L. Juvela et al., \Speech Waveform Synthesis from MFCC Sequences with Generative Adversarial Networks, IEEE ICASSP, Calgary, AB, 2018, pp. 5679-5683.
L. Juvela, et al. \Waveform Generation for Text-to-Speech Synthesis using Pitch-Synchronous Multi-scale Generative Adversarial Networks, arXiv preprint arXiv:1810.12598 (2018).
L. Juvela, V. Tsiaras, B. Bollepalli, M. Airaksinen, J. Yamagishi, and P. Alku, \Speaker-independent Raw Waveform Model for Glottal Excitation, Proc. Interspeech 2018, pp. 2012{2016.
Pascual, S. et al "Segan: Speech Enhancement Generative Adversarial Network" Interspeech, Jan. 1, 2017, pp. 3642-3646.
S. Kankanahalli, \End-To-End Optimized Speech Coding with Deep Neural Networks, IEEE ICASSP, Calgary, AB, 2018, pp. 2521-2525.9.
Saito. Y. et al "Text-to-Speech Synthesis Using STFT Spectra Based on Low-/Multi-Resolution Generative Adversarial Networks" IEEE International Conference on Acoustics, Speech and Signal Processing, 2018, 5299-303.
W. B. Kleijn and K. K. Paliwal, Eds., Speech Coding and Synthesis, Amsterdam, The Netherlands: Elsevier, 1995, Ch. 12, pp. 433-466.
Zhao, Y. et al "Wasserstein GAN and Waveform Loss-Based Acoustic Model Training for Multi-Speaker Text-to-Speech Synthesis Systems Using a WaveNet Vocoder" IEEE access. vol. 6, pp. 60478-60488, 2018.
Zhou, Changlin et al.; "Real-Time Implementation of G.729A Encoding and Decoding Based on DSP"; Chinese Journal of Scientific Instrument; vol. 28; No. 10; Oct. 15, 2007; pp. 1911-1915.

* cited by examiner

METHOD, APPARATUS AND SYSTEM FOR HYBRID SPEECH SYNTHESIS

CROSS-REFERENCE TO RELATED APPLICATIONS

This application claims priority of the following priority applications: U.S. provisional application 62/787,831, filed 3 Jan. 2019 and EP application 19150154.3, filed 3 Jan. 2019, which are hereby incorporated by reference.

TECHNOLOGY

The present disclosure relates generally to methods, apparatuses and a system of encoding an original speech signal and decoding an original speech signal for hybrid adversarial-parametric speech synthesis, and more specifically to improve the synthesis of original speech signals using compact-learned-parametric representation by implementing a Generator trained in a Generative Adversarial Network setting in combination with linear predictive coding.

While some embodiments will be described herein with particular reference to that disclosure, it will be appreciated that the present disclosure is not limited to such a field of use and is applicable in broader contexts.

BACKGROUND

Any discussion of the background art throughout the disclosure should in no way be considered as an admission that such art is widely known or forms part of common general knowledge in the field.

Speech is an acoustic signal generated by the human vocal system that transmits a speaker's intention with linguistic and emotional information. In digital systems, speech signals are represented as waveforms describing the time-dependent progression of the amplitude of the respective speech signal.

Challenges arise when speech signals are to be transmitted using digital communication systems. Especially for communication channels with limited bandwidth, for example, mobile telephone networks, an efficient representation of speech signal waveforms is important. A reliable signal representation requires high sampling rates. Transmitting an original speech signal waveform at high sampling rates, however, incurs high bit rates and power consumption thus violating channel bandwidth saving. To save channel bandwidth, speech signal compression enables to transmit compact representations of the respective speech signal waveforms. These compact representations are generally sufficient for reliable speech signal waveform reconstruction.

A successful approach used until now in this context is a model-based representation of speech signals which enables to describe a speech signal waveform in terms of model parameters. The source-filter model is a well-known approach in speech modelling utilizing the creation of a glottal excitation signal (the source component) and spectral shaping of the glottal excitation signal (the filter component).

A speech codec may consist of two parts, an encoder which decomposes the speech signal into its glottal excitation plus its spectral envelope and a decoder which reconstructs the speech signal back again. In this context, the encoder may perform a linear predictive coding analysis task to create the respective components of the source-filter model and the decoder may perform the respective linear predictive coding synthesis task by reconstructing the speech signal.

The overall goal in signal compression is, however, to find a compact representation that can encode the speech signal with less amount of data footprint and that allows for reliable and fast reconstruction.

Recently, Generative Adversarial Networks (GANs) have gained more and more interest due to their continuously improving reliability when applied, for example, in tasks including conditional image synthesis, image-to-image translation, image style transfer, image super-resolution, image painting, text-to-image synthesis, video generation etc. After having been applied for speech enhancement, GANs have also gained increasing interest in the field of speech and audio signal processing.

L. Juvela, B. Bollepalli, X. Wang, H. Kameoka, M. Airaksinen, J. Yamagishi and P. Alku, for example, presented in their publication on "*Speech waveform synthesis from MFCC sequences with Generative Adversarial Networks*", IEEE ICASSP, Calgary, A B, 2018, pp. 5679-5683, a method for speech reconstruction from filterbank mel frequency cepstral coefficients (MFCC).

S. Kankanahalli, presented in the publication on "*End-to-End optimized speech coding with deep neural networks*", IEEE ICASSP, Calgary, A B, 2018, pp. 2521-2525, a proof-of-concept of applying deep neural networks (DNNs) to speech coding. The wideband speech coder in this publication was learned end-to-end from raw signal, with almost no audio-specific processing aside from a relatively simple perceptual loss.

Moreover, L. Juvela, V. Tsiaras, B. Bollepalli, M. Airaksinen, J. Yamagishi, and P. Alku proposed in their publication on "*Speaker-independent raw waveform model for glottal excitation*", Proc. Interspeech 2018, pp. 2012-2016, a speaker-independent neural waveform generator which combined a linear autoregressive (vocal tract filter) process with a non-linear (glottal source) excitation process parametrized by a WaveNet.

Despite ongoing research, one challenging limitation of deep generative models for parametric speech synthesis, however, is the very slow generation process. Current deep generative models for parametric speech synthesis usually work in an autoregressive sequential manner wherein the signal is generated sequentially in a sample-by-sample fashion.

Consequently, there is still an existing need for efficient signal compression of speech signals allowing at the same time for reliable and fast reconstruction, especially at lower bit rates.

SUMMARY

In accordance with a first aspect of the present disclosure there is provided a method of encoding an original speech signal for hybrid adversarial-parametric speech synthesis. The method may include the step of (a) receiving the original speech signal. The method may further include the step of (b) applying linear prediction coding analysis filtering to the original speech signal for obtaining a corresponding residual. The method may further include the step of (c) inputting the obtained residual into an encoder part of a Generator for encoding the residual. The method may further include the step of (d) outputting, by the encoder part of the Generator, a compressed representation of the residual. The method may further include the step of (e) applying linear prediction coding analysis filtering to the original speech signal for estimating original linear prediction coding parameters. And the method may further include the step of (f) quantizing and transmitting the original linear prediction coding parameters and the compressed representation of the residual.

In one embodiment, the order used for linear prediction coding analysis filtering in step (e) may be equal to or higher than in step (b).

In one embodiment, the order used for linear prediction coding analysis filtering in step (b) may be 16.

In one embodiment, the order used for linear prediction coding analysis filtering in step (e) may be of from 16 to 50.

In one embodiment, the Generator may be a Generator trained in a Generative Adversarial Network setting.

In one embodiment, the Generative Adversarial Network setting may include one or more of a geometric setting, a Wasserstein setting and an energy-based setting.

In one embodiment, the encoder part of the Generator may include L layers with N filters in each layer, wherein L is a natural number $\geq 1$ and wherein N is a natural number $\geq 1$.

In one embodiment, in at least one layer of the L layers, a 1D convolution operation may be performed followed by a non-linear operation including a parametric rectified linear unit (PReLU), a rectified linear unit (ReLU), a leaky rectified linear unit (LReLU), an exponential linear unit (eLU) and a scaled exponential linear unit (SeLU).

In one embodiment, the size of the N filters in each of the L layers may be the same.

In one embodiment, the N filters in each of the L layers may operate with a stride of 2.

In one embodiment, an output layer may subsequently follow the last of the L layers of the encoder part of the Generator.

In one embodiment, the output layer may include N filters operating with a stride of 1.

In one embodiment, a 1D convolution operation may be performed in the output layer followed by a non-linear operation including a parametric rectified linear unit (PReLU), a rectified linear unit (ReLU), a leaky rectified linear unit (LReLU), an exponential linear unit (eLU) and a scaled exponential linear unit (SeLU).

In accordance with a second aspect of the present disclosure there is provided a method of decoding an original speech signal for hybrid adversarial-parametric speech synthesis. The method may include the steps of (a) receiving quantized original linear prediction coding parameters estimated by applying linear prediction coding analysis filtering to an original speech signal and a quantized compressed representation of a residual of the original speech signal. The method may further include the step of (b) dequantizing the original linear prediction coding parameters and the compressed representation of the residual. The method may further include the step of (c) inputting the dequantized compressed representation of the residual into a decoder part of a Generator for applying adversarial mapping from the compressed residual domain to a fake (first) signal domain. The method may further include the step of (d) outputting, by the decoder part of the Generator, a fake speech signal. The method may further include the step of (e) applying linear prediction coding analysis filtering to the fake speech signal for obtaining a corresponding fake residual. And the method may further include the step of (f) reconstructing the original speech signal by applying linear prediction coding cross-synthesis filtering to the fake residual and the dequantized original linear prediction coding analysis parameters.

In one embodiment, the order used for linear prediction coding analysis filtering in step (e) may be the same as the order used for estimating the original linear prediction coding parameters.

In one embodiment, the order used for linear prediction coding analysis filtering in step (e) may be of from 16-50.

In one embodiment, the Generator may be a Generator trained in a Generative Adversarial Network setting.

In one embodiment, the Generative Adversarial Network setting may include one or more of a geometric setting, a Wasserstein setting and an energy-based setting.

In one embodiment, the decoder part of the Generator may include an adversarial generation segment.

In one embodiment, the adversarial generation segment may include L layers with N filters in each layer, wherein L is a natural number $\geq 1$ and wherein N is a natural number $\geq 1$.

In one embodiment, in at least one layer of the L layers of the adversarial generation segment a transposed convolution may be performed followed by a gated tanh unit.

In one embodiment, the size of the N filters in each of the L layers of the adversarial generation segment may be the same.

In one embodiment, the N filters in each of the L layers of the adversarial generation segment may operate with a stride of 2.

In one embodiment, an output layer may subsequently follow the last of the L layers of the adversarial generation segment.

In one embodiment, the output layer may include N filters operating with a stride of 1.

In one embodiment, a 1D convolution operation may be performed in the output layer followed by a tanh operation.

In one embodiment, the decoder part of the Generator may further include a context decoding segment prior to the adversarial generation segment.

In one embodiment, the context decoding segment may include L=1 layers with N filters, wherein N is a natural number $\geq 1$, followed by one or more blocks of gated tanh units.

In one embodiment, in the L=1 layers of the context decoding segment, the size of the N filters may be 1 and a 1D convolution operation may be performed.

In one embodiment, the N filters in the L=1 layers of the context decoding segment may operate with a stride of 1.

In one embodiment, the output of the one or more blocks of gated tanh units of the context decoding segment may be concatenated with a random noise vector (z).

In one embodiment, the context decoding segment may include 10 blocks of gated tanh units.

In accordance with a third aspect of the present disclosure there is provided an apparatus for encoding an original speech signal for hybrid adversarial-parametric speech synthesis. The apparatus may include (a) a receiver for receiving the original speech signal. The apparatus may further include (b) a linear prediction coding analysis filter for applying linear prediction coding analysis filtering to the original speech signal for obtaining a corresponding residual. The apparatus may further include (c) an encoder part of a Generator configured to receive at an input of the encoder part the obtained residual and to output at an output of the encoder part a compressed representation of the residual, for encoding the residual. The apparatus may further include (d) a linear prediction coding analysis filter for applying linear prediction coding analysis filtering to the original speech signal for estimating original linear prediction coding parameters. And the apparatus may further include (e) means for quantizing and transmitting the original linear prediction coding parameters and the compressed representation of the residual.

In accordance with a fourth aspect of the present disclosure there is provided an apparatus for decoding an original speech signal for hybrid adversarial-parametric speech synthesis. The apparatus may include (a) a receiver for receiving quantized original linear prediction coding parameters estimated by applying linear prediction coding analysis filtering to an original speech signal and a quantized compressed representation of a residual of the original speech signal. The apparatus may further include (b) means for dequantizing the original linear prediction coding parameters and the compressed representation of the residual. The apparatus may further include (c) a decoder part of a Generator for generating a fake speech signal. The apparatus may further include (d) a linear prediction analysis filter for applying linear prediction coding analysis filtering to the fake speech signal for obtaining a corresponding fake residual. And the apparatus may further include (e) a linear prediction coding synthesis filter for reconstructing the original speech signal by applying linear prediction coding cross-synthesis filtering to the fake residual and the dequantized original linear prediction coding analysis parameters.

In accordance with a fifth aspect of the present disclosure there is provided a system of an apparatus for encoding an original speech signal for hybrid adversarial-parametric speech synthesis, wherein the apparatus is configured to perform a method of encoding an original speech signal for hybrid adversarial-parametric speech synthesis and an apparatus for decoding an original speech signal for hybrid adversarial-parametric speech synthesis, wherein the apparatus is configured to perform a method of decoding an original speech signal for hybrid adversarial-parametric speech synthesis.

In accordance with a sixth aspect of the present disclosure there is provided a method for training a Generator in a Generative Adversarial Network setting including a Generator including an encoder part and a decoder part and a Discriminator. The method may include the steps of (a) inputting a compressed representation of a residual of an original speech signal into the Generator. The method may further include the step of (b) generating, by the Generator, a fake speech signal based on the compressed representation of the residual. The method may further include the step of (c) inputting, one at a time, the fake speech signal and the compressed residual of the original speech signal, from which the fake speech signal was generated, into the Discriminator. The method may further include the step of (d) judging, by the Discriminator, whether the fake speech signal corresponds to the compressed residual of the original speech signal or to an undefined compressed residual. And the method may further include the step of (e) tuning the parameters of the Generator until the Discriminator can no longer distinguish whether the fake speech signal corresponds to the compressed residual of the original speech signal or to the undefined compressed residual.

In one embodiment, the Generative Adversarial Network setting may include one or more of a geometric setting, a Wasserstein setting and an energy-based setting.

In one embodiment, judging by the Discriminator may be based on one or more loss functions.

In one embodiment, the Discriminator may include an encoder stage and the encoder stage may include L layers with N filters in each layer, wherein L is a natural number ≥1 and wherein N is a natural number ≥1.

In one embodiment, in at least one layer of the L layers a 1D convolution operation may be performed followed by a non-linear operation including a leaky rectified linear unit (LReLU).

In one embodiment, the size of the N filters in each of the L layers may be the same.

In one embodiment, the N filters in each of the L layers may operate with a stride of 2.

In accordance with a seventh aspect of the present disclosure there is provided a computer program product comprising a computer-readable storage medium with instructions adapted to cause the device to carry out a method of encoding an original speech signal for hybrid adversarial-parametric speech synthesis.

In accordance with an eighth aspect of the present disclosure there is provided a computer program product comprising a computer-readable storage medium with instructions adapted to cause the device to carry out a method of decoding an original speech signal for hybrid adversarial-parametric speech synthesis.

In accordance with a ninth aspect of the present disclosure there is provided a computer program product comprising a computer-readable storage medium with instructions adapted to cause the device to carry out a method for training a Generator in a Generative Adversarial Network setting comprising a Generator including an encoder part and a decoder part and a Discriminator.

BRIEF DESCRIPTION OF THE DRAWINGS

Example embodiments of the disclosure will now be described, by way of example only, with reference to the accompanying drawings in which.

DESCRIPTION OF EXAMPLE EMBODIMENTS

Hybrid Adversarial-Parametric Speech Synthesis

A novel approach for deep neural speech vocoding with fast signal generation is described. This approach utilizes a combination of linear prediction coding (LPC) and adversarial generation of speech signals based on a Generative Adversarial Network (GAN) setting. Using GAN as a deep-probabilistic generative modeling framework, a fake speech signal may be synthesized from a high neutrally-compressed representation of a residual of an original speech signal. LPC analysis may be used, in particular, to determine the spectral envelope of the respective original signal as well as the residual of the synthesized fake speech signal. LPC synthesis between the spectral envelope of the respective original signal and the residual of the synthesized fake speech signal may then be used to obtain the final-natural reconstruction of the original speech signal.

Hybrid adversarial-parametric speech synthesis especially enables fast signal generation. Advantageously, the signal generation process can be performed in parallel rather than in a sequential manner. The generated signal may thus be obtained at once rather than in a sample-by-sample fashion.

Overview

Figure 1:
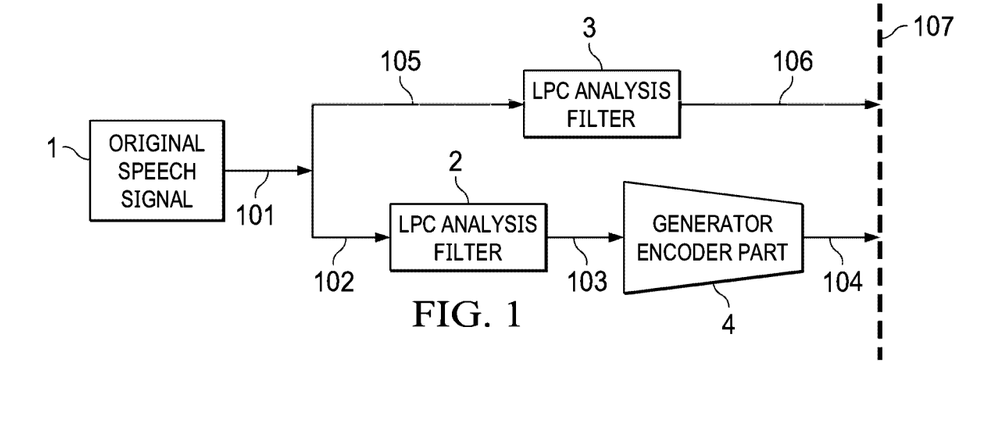
FIG. 1 illustrates a flow diagram of an example of a method of encoding an original speech signal for hybrid adversarial-parametric speech synthesis.

Referring to the example of FIG. 1, a method of encoding an original speech signal for hybrid adversarial-parametric speech synthesis is illustrated. In step 101, an original speech signal, 1, is received. In step 102, linear prediction coding analysis filtering is applied to the original speech signal, 1, using a linear prediction coding analysis filter, 2, to obtain a corresponding residual of the original speech signal, 1. In step 103, the residual of the original speech signal, 1, is then input into an encoder part of a Generator, 4. Details of the Generator will be described further below. The encoder part of the Generator, 4, encodes the residual of the original speech signal, 1. In step 104, as an output from the encoder part of the Generator, 4, a compressed representation of the residual is obtained. While the compression is not limited, the compressed representation of the residual may be 20 parameters per frame of 320 samples of the residual at a sampling rate of 16 kHz. In step 105, linear prediction coding analysis filtering is again applied to the original speech signal, 1, using a linear prediction coding analysis filter, 3, to estimate, as an output in step 106, linear prediction coding parameters of the original speech signal, 1, i.e. original linear prediction coding parameters.

While the order of the linear prediction coding analysis filters, 2, 3, for obtaining the corresponding residual of the original speech signal, 1, as well as for estimating the original linear prediction coding parameters is not limited, in one embodiment, the order of the linear prediction coding filter, 3, for estimating the original linear prediction coding parameters may be equal to or higher than the order of the linear prediction coding filter, 2, for obtaining the residual of the original speech signal, 1. In one embodiment, the order of the linear prediction coding filter, 2, for obtaining the residual of the original speech signal, 1, may be 16. In one embodiment, the order of the linear prediction coding analysis filter, 3, for estimating the original linear prediction coding parameters may be of from 16 to 50. While the order of the linear prediction coding filter, 3, for estimating the original linear prediction coding parameters may generally be arbitrary, increasing the number of estimated original linear prediction coding parameters may lead to a better signal reconstruction at the decoder. While further the linear prediction coding analysis and synthesis configurations are not limited, the configurations may include optimizations including one or more of perceptual weight-filtering, frequency warping and bandwidth extension.

In step 107, the compressed representation of the residual obtained in step 104 and the original linear prediction coding parameters estimated in step 106 are then quantized and transmitted.

Figure 2:
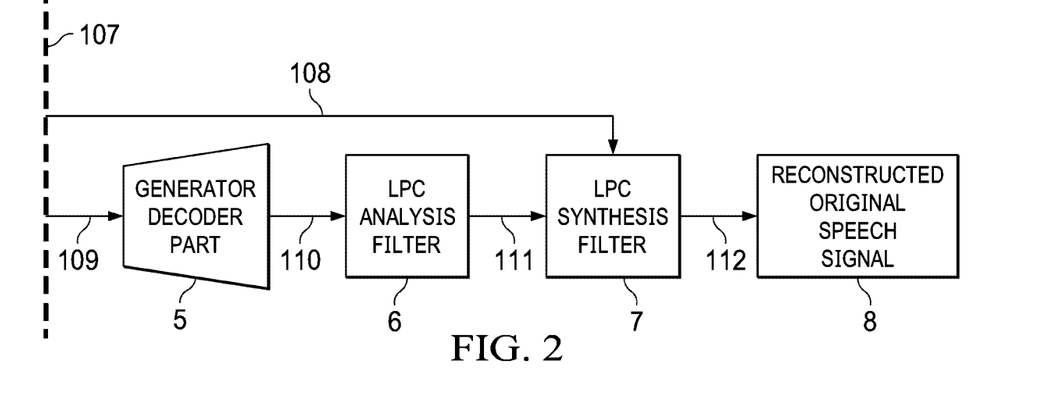
FIG. 2 illustrates an example of a method of decoding an original speech signal for hybrid adversarial-parametric speech synthesis.

Referring now to the example of FIG. 2, a method of decoding an original speech signal for hybrid adversarial-parametric speech synthesis is illustrated. The quantized versions of both, the original linear prediction coding parameters estimated by applying linear prediction coding analysis filtering, step 105, to an original signal, 1, and the compressed representation of the residual of the same original signal, 1, are received in step 107. In step 108, the quantized original linear prediction coding parameters are dequantized for reconstruction of the original speech signal, 1. In step 109, also the quantized compressed representation of the residual of the original signal, 1, is dequantized and input into a decoder part of a Generator, 5.

Figure 3:
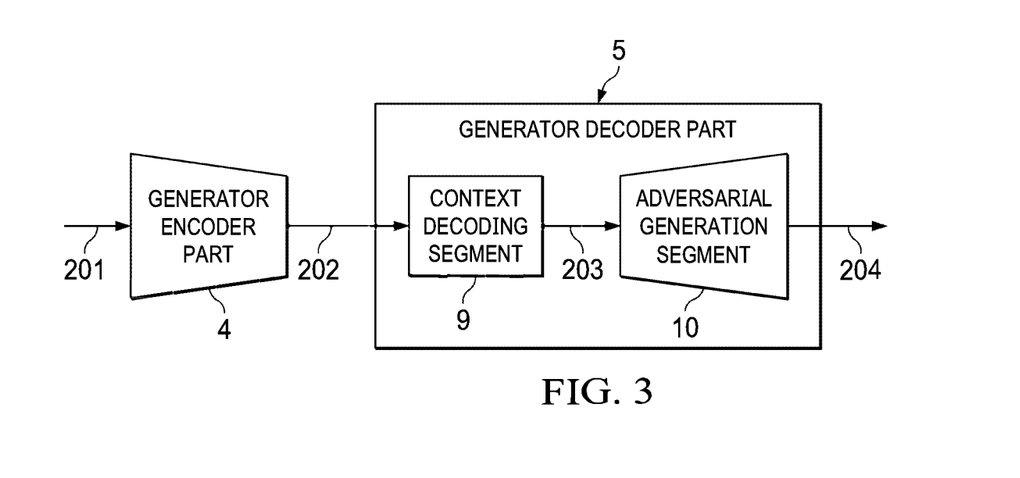
FIG. 3 illustrates an example of a Generator trained in a Generative Adversarial Network setting, wherein the decoder part includes a context decoding segment and an adversarial generation segment.

In one embodiment, the decoder part of the Generator, 5, may include an adversarial generation segment, 10. In one embodiment, the decoder part of the Generator, 5, may further include a context decoding segment, 9, prior to the adversarial generation segment, 10, as illustrated in the example of FIG. 3 and described further below. The decoder part of the Generator, 5, applies adversarial generative mapping from the compressed residual domain to a fake signal domain. The fake signal domain may also be denoted as a first signal domain.

As an output from the decoder part of the Generator, 5, a fake speech signal is obtained. In step 110, linear prediction coding analysis filtering using a linear prediction coding analysis filter, 6, is applied to the fake speech signal to obtain in step 111 a fake residual of the fake speech signal. The order of the linear prediction coding analysis filter, 6, applied may be the same as the order of the linear prediction coding analysis filter, 3, applied to estimate the original linear prediction coding parameters in the encoder. In one embodiment, the order of the linear prediction coding analysis filter, 6, applied in step 110, may be of from 16 to 50. Linear prediction coding cross-synthesis filtering using a linear prediction coding synthesis filter, 7, is then applied to the dequantized original linear prediction coding parameters, as obtained in step 108, and the fake residual of the fake speech signal, as obtained in step 111, to obtain in step 112 the reconstructed original speech signal, 8.

The above described methods of encoding and decoding an original speech signal for hybrid adversarial-parametric speech synthesis may be implemented on respective apparatuses for encoding and decoding an original speech signal for hybrid adversarial-parametric speech synthesis, for example, a respective encoder and decoder. The encoder and the decoder may each be part of separate devices. The encoder and the decoder in combination may also form a system. The system may also be implemented in one single device.

The Generator

Referring now to the example of FIG. 3, a Generator trained in a Generative Adversarial Network setting is illustrated schematically. The Generator includes an encoder part, 4, and a decoder part, 5. While the decoder part, 5, may only include an adversarial generation segment, 10, in the example illustrated in FIG. 3, the decoder part, 5, further includes a context decoding segment, 9, prior to the adversarial generation segment, 10.

In step 201, a residual of an original speech signal is input into the encoder part of the Generator, 4, where the residual is encoded. The compressed representation of the residual is then input into the decoder part of the Generator, 5, in step 202.

As already stated above, the decoder part of the Generator, 5, may include a context decoding segment, 9, prior to the adversarial generation segment, 10. This allows for concatenating the context decoding and the adversarial generation. The compressed representation of the residual may thus enter the context decoding segment, 9, first. The output of the context decoding segment, 9, in step 203 may then enter the adversarial generation segment, 10.

In the decoder part of the Generator, 5, a fake speech signal is generated based on the compressed representation of the residual by applying adversarial mapping from the compressed residual domain to the fake (first) signal domain. In step 204, the fake speech signal generated by the decoder part of the Generator, 5, is then obtained as an output from the adversarial generation segment, 10.

The respective architectures of the encoder part, 4, and the decoder part, 5, will now be described in more detail.

Figure 4:
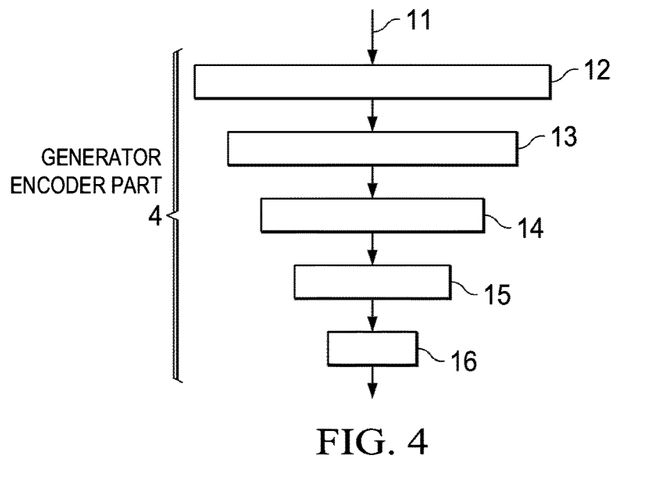
FIG. 4 illustrates an example of an encoder part architecture of a Generator trained in a Generative Adversarial Network setting.

Referring to the example of FIG. 4, the layered architecture of an encoder part of a Generator, 4, is illustrated schematically.

Generally, it is the task of the encoder part of the Generator to learn a very compressed parametric representation of the residual obtained from applying the linear prediction coding analysis filtering to the original speech signal. This compressed parametric representation obtained in the encoding method is input, i.e. used as the conditional prior, for the decoder part of the Generator.

While the architecture of the encoder part of the Generator, 4, is not limited, in one embodiment, the encoder part, 4, may include a number of L layers with a number of N filters in each layer L. L may be a natural number $\geq 1$ and N may be a natural number $\geq 1$. The size (also known as kernel size) of the N filters is not limited and may be chosen according to the requirements for encoding the residual of an original speech signal. In one embodiment, the size of the N filters may be the same in each of the L layers. In one embodiment, the N filters in each of the L layers may operate with a stride of 2.

In the example embodiment of FIG. 4, a residual of an original speech signal may be input into the encoder part of the Generator in a first step, 11. The first of the illustrated encoder layers, 12, layer number L=1, may include N filters operating with a stride of 2 and having a filter size (or kernel size) of 64. The second illustrated encoder layer, 13, layer number L=2, may also include N filters operating with a stride of 2 and having a filter size of 64. While the encoder part of the Generator is not limited with regard to the number of layers L, in the example embodiment of FIG. 4, the encoder part of the Generator includes in total 4 layers, 12, 13, 14, 15, wherein each of the 4 layers may include N filters having a filter size of 64 and operating with a stride of 2. Alternatively, the N filters may operate with a stride of 1 in each of the 4 encoder layers, 12, 13, 14, 15, followed by a down-sampling by a factor of 2.

In one embodiment, in at least one of the encoder layers, a 1D convolution operation may be performed followed by a non-linear operation as an activation that may include one or more of a parametric rectified linear unit (PReLU), a rectified linear unit (ReLU), a leaky rectified linear unit (LReLU), an exponential linear unit (eLU) and a scaled exponential linear unit (SeLU). In the example of FIG. 4, the non-linear operation may be based on PReLU. A 1D convolutional operation followed by PReLU as an activation may also be performed in each of the encoder layers. In this, the input signal is progressively down-sampled by a factor of 2.

An output layer or compression layer, 16, may subsequently follow the last of the encoder layers, 15. While the number N and the size of the filters in the output layer is not limited, in the example of FIG. 4, the output layer, 16, may include N filters with a size of 65, wherein the N filters may operate with a stride of 1 (no down-sampling). In the output layer, a 1D convolution operation may be performed followed by a non-linear operation that may include one or more of a parametric rectified linear unit (PReLU), a rectified linear unit (ReLU), a leaky rectified linear unit (LReLU), an exponential linear unit (eLU) and a scaled exponential linear unit (SeLU). In this, in the output layer, a flattening operation may be performed to obtain a channel number of 1.

The architecture of the encoder part of the Generator schematically illustrated in FIG. 4 may be summarized as follows:

11/Input: residual of an original speech signal
12/encoder layer L=1: in_channels=1, out_channels=32, kernel size=64, stride=2, activation=PReLU
13/encoder layer L=2: in_channels=32, out_channels=64, kernel size=64, stride=2, activation=PReLU
14/encoder layer L=3: in_channels=64, out_channels=64, kernel size=64, stride=2, activation=PReLU
15/encoder layer L=4: in_channels=64, out_channels=128, kernel size=64, stride=2, activation=PReLU
16/output layer: in_channels=128, out_channels=1, kernel size=65, stride=1, activation=PReLU The above presented architecture merely represents an example. Depending on the application, the number of layers in the encoder part may be down-scaled or up-scaled, respectively.

Figure 5:
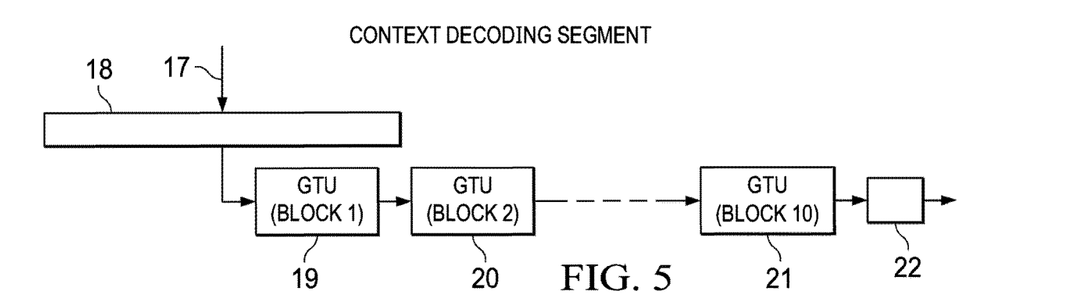
FIG. 5 illustrates an example of a context decoding segment architecture.

Referring now to the example of FIG. 5, the architecture of a context decoding segment of a decoder part of a Generator is schematically illustrated. Context decoding may include two processes. In the first process, a compressed representation of a residual may be input, 17, into a layer, 18, layer number L=1, of the context decoding segment. The L=1 layer, 18, may include N filters operating with a stride of 1 and having a filter size of 1. In the L=1 layer, 18, a 1D convolution may be performed on the compressed representation of the residual to obtain 64 channels (the output may be denoted as embedding).

In the second process, the output of the L=1 layer, 18, may be passed through one or more blocks of gated tanh units (GTU), 19, 20, 21. While the number of gated tanh units is not limited, in one embodiment, the context decoding segment may include 10 blocks of gated tanh units. In one embodiment, the output of the last block of gated tanh units may be concatenated with a random noise vector (z), 22.

The architecture of the context decoding segment of the decoder part of the Generator schematically illustrated in FIG. 5 may be summarized as follows:

17/Input: compressed representation of a residual of an original speech signal
18/layer L=1: in_channels=1, out_channels=64, kernel size=1, stride=1
19/gated tanh unit
20/gated tanh unit
. . .
21/gated tanh unit
22/concatenation with random noise vector (z)

In providing a context decoding segment prior to the adversarial generation segment, the output of the encoder part of the Generator may thus be mapped into a different-embedded-hidden space which has proven to be better for applying adversarial up-sampling by the adversarial generation segment to obtain the fake speech signal.

In the following, before describing details of the adversarial generation segment, the operation of a gated tanh unit will be described in more detail. In one embodiment, at least one of the gated tanh units of the context decoding segment may be softmax gated. In one embodiment, the gated tanh units of the context decoding segment may all be softmax gated. Generally, all layers of the decoder part of the Generator wherein a 1D convolution operation is performed may have a softmax gated tanh activation function, wherein the softmax is applied along a channel dimension of a gate output tensor.

A function defined by such a gated layer may be given by:

$$\text{out} = \tanh(W_f * X) \odot \text{softmax}(W_g * X)|_c \quad (1)$$

where out is the output of the gated 1D convolution layer, X is the input to the gated 1D convolution layer, $W_f$ are the weights of a 1D convolutional filter, $W_g$ are the weights of a 1D convolutional gate, * denotes the convolution operation, $\odot$ denotes an element-wise multiplication and softmax (.)|c denotes a softmax operation applied along the channel dimension of its input tensor.

Figure 6:
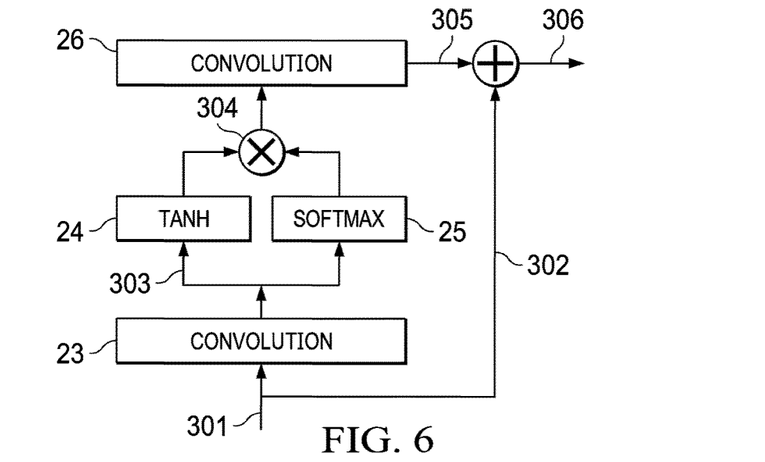
FIG. 6 illustrates an example of the operation of a softmax gated tanh unit.

Referring now to the example of FIG. 6, the operation of a softmax gated tanh unit is schematically illustrated. In the example of FIG. 6, in step 301, an input is made into a convolutional layer, 23, of a softmax gated tanh unit. A 1D convolutional operation may be performed in the convolutional layer, 23. The convolutional layer, 23, may further include N filters operating with a stride of 1. While the size of the N filters is not limited, in the example of FIG. 6, the filter size may be 65. The output from the convolutional layer, 23, may then be divided into two parts in step 303. For example, if the output from the convolutional layer, 23, is 64 channels, these 64 channels may be divided equally into 32 channels progressing to the tanh gate, 24, and 32 channels progressing to the softmax gate, 25. While the tanh gate operates on the 32 channels along the sample dimension, the softmax gate operates along the channel dimension. In step 304, the output from the tanh gate, 24, and the softmax gate, 25, may then be multiplied element-wise. The output from the multiplication in step 304, is then input into a further convolution layer, 26, wherein also a 1D convolution may be performed. Convolution layer, 26, may include N filters of size 1, operating with a stride of 1. The output of the convolution layer, 26, in step 305, is then combined with the residual connection of step 302. The residual connection may prevent vanishing gradients for deeper layers of the decoder part of the Generator. In this, the residual connection may keep enough gradients during a back-propagation process leading to a faster convergence. The output shape in step 306 finally corresponds to the shape of the input in step 301, thus no change in dimensionality occurs within the gated tanh unit.

Figure 7:
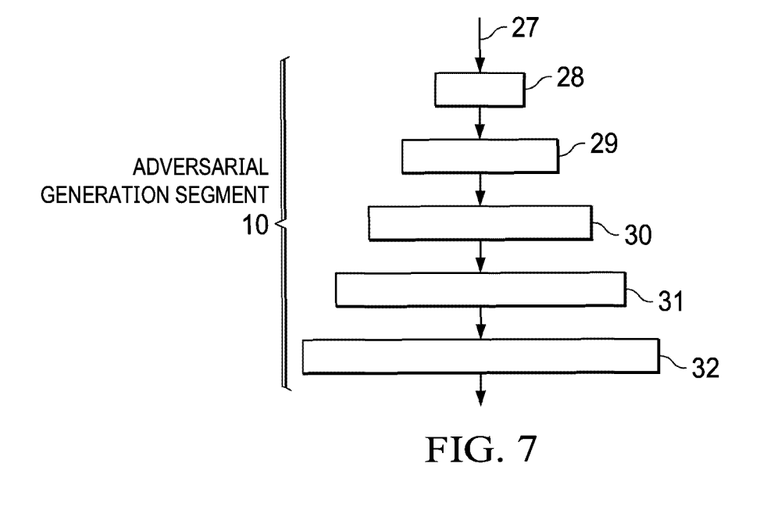
FIG. 7 illustrates an example of an adversarial generation segment architecture.

Referring now to the example of FIG. 7, the layered architecture of an adversarial generation segment of a decoder part of a Generator is schematically illustrated. While the architecture of the adversarial generation segment of the Generator is generally not limited, in one embodiment, the adversarial generation segment may include a number of L layers with a number of N filters in each layer L. L may be a natural number ≥1 and N may be a natural number ≥1. The size of the N filters is not limited and may be chosen according to the requirements for generating a fake speech signal from a compressed representation of a residual of an original speech signal. In one embodiment, the size of the N filters may be the same in each of the L layers. In one embodiment, the N filters in each of the L layers may operate with a stride of 2.

In the example of FIG. 7, the output of the context decoding segment may be input, 27, into the first layer, 28, of the adversarial generation segment. The first illustrated layer, 28, layer number L=1, may include N filters operating with a stride of 2 and having a filter size (or kernel size) of 66. The second illustrated layer, 29, layer number L=2, may also include N filters operating with a stride of 2 and having a filter size of 66. While the adversarial generation segment is not limited with regard to the number of layers L, in the example of FIG. 7, the adversarial generation segment may include in total 4 layers, 28, 29, 30, 31, wherein each of the 4 layers may include N filters having a filter size of 66 and operating with a stride of 2. Alternatively, the filters may operate with a stride of 1 in each of the 4 encoder layers, 28, 29, 30, 31, followed by a down-sampling by a factor of 2. In one embodiment, in at least one of the L layers, a transposed convolution operation may be performed followed by a gated tanh unit (GTU). In one embodiment, the gated tanh unit may be softmax gated.

An output layer, 32, may subsequently follow the last of the L layers, 31. While the number N and the size of the filters in the output layer is not limited, in the example of FIG. 7, the output layer, 32, may include N filters with a size of 65 operating with a stride of 1. In the output layer a 1D convolution may be performed followed by a tanh operation to obtain a fake speech signal.

Figure 8:
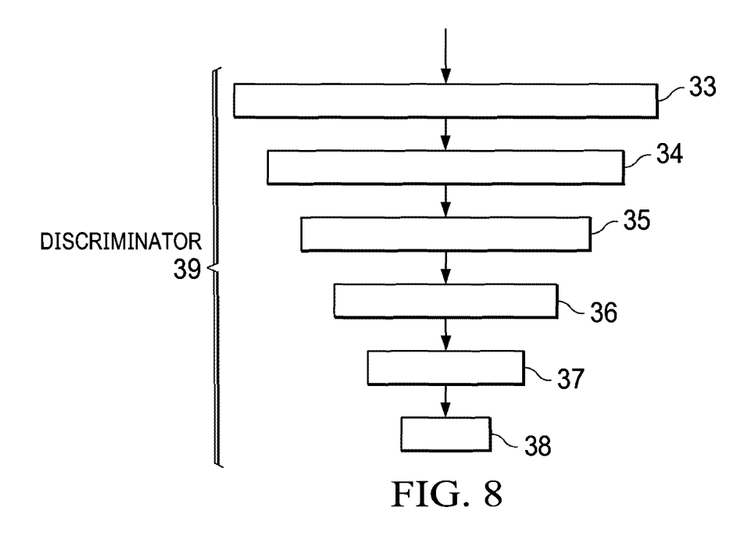
FIG. 8 illustrates an example of a Discriminator architecture.

The architecture of the adversarial generation segment schematically illustrated in FIG. 7 may be summarized as follows:

- 27/Input: output of the context decoding segment concatenated with a random noise vector (z)
- 28/layer L=1: in_channels=128, out_channels=32, kernel size=66, stride=2, GTU (32)
- 29/layer L=2: in_channels=64, out_channels=32, kernel size=66, stride=2, GTU (32)
- 30/layer L=3: in_channels=64, out_channels=16, kernel size=66, stride=2, GTU (16)
- 31/layer L=4: in_channels=32, out_channels=32, kernel size=66, stride=2, GTU (32)
- 32/output layer: in_channels=32, out_channels=1, kernel size=65, stride=1, activation=tanh The Discriminator Referring now to the example of FIG. 8, the architecture of a Discriminator, 39, of a Generative Adversarial Network setting for training a Generator is illustrated schematically. In one embodiment, the Discriminator, 39, may include a number of L layers, 33, 34, 35, 36, 37 wherein each layer may include a number of N filters. L may be a natural number ≥1 and N may be a natural number ≥1. The size of the N filters is not limited and may be chosen according to the requirements of the Discriminator, 39. In one embodiment, the filter size may be the same in each of the L layers. In one embodiment, the N filters may operate with a stride of 2. In one embodiment, in at least one of the L layers of the Discriminator, 39, a 1D convolution operation may be performed followed by a non-linear operation which may include LReLU.

In an embodiment, the Discriminator, 39, may include an output layer, 38, subsequently following the last of the L layers, 37. In one embodiment, the output layer, 38, may have N filters having a filter size of 32. In an embodiment, the N filters may operate with a stride of 2. The output layer, 38, may thus be a one-dimensional convolution layer that down-samples hidden activations.

Referring to the example in FIG. 8, the architecture of the Discriminator may be summarized as follows:

- 33/Discriminator layer L=1: in_channels=2, out_channels=16, filter size=32, stride=2, activation=Leaky ReLU
- 34/Discriminator layer L=2: in_channels=16, out_channels=16, filter size=32, stride=2, activation=Leaky ReLU
- 35/Discriminator layer L=3: in_channels=16, out_channels=32, filter size=32, stride=2, activation=Leaky ReLU 36/Discriminator layer L=4: in_channels=32, out_channels=32, filter size=32, stride=2, activation=Leaky ReLU 37/Discriminator layer L=5: in_channels=32, out_channels=64, filter size=32, stride=2, activation=Leaky ReLU 38/output layer: in_channels=64, out_channels=32, filter size=32, stride=2 Output (not shown): judgement on the input as original speech signal/fake speech signal The above presented architecture merely represents an example. Depending on the application, the number of layers in the Discriminator may be down-scaled or up-scaled, respectively.

Generative Adversarial Network (GAN) Setting

In one embodiment, the Generator may be a Generator trained in a Generative Adversarial Network setting (GAN setting). In one embodiment, the GAN setting may include one or more of a geometric GAN setting, a Wasserstein GAN setting and an energy-based GAN setting. In one embodiment, the GAN setting may further be a conditional GAN setting which may be set up by a conditional Generator, and a conditional Discriminator.

The Discriminator may be conditioned by inputting the same input as to the Generator. The Discriminator may then contain two input channels, one for an original or fake speech signal, the other for a corresponding residual. When the Discriminator judges the input as original speech signal, the original residual may represent a conditioning as it is the linear prediction coding counterpart of the original speech signal. Vice versa, when the Discriminator judges the input as fake speech signal, the original residual may represent a conditioning as it is the input to the Generator which generates the fake speech signal. The original residual may thus be able to condition the Discriminator.

The Generator may include an encoder part and a decoder part. The decoder part may include an adversarial generation segment. The decoder part may also further include a context decoding segment prior to the adversarial generation segment. In any case, all parts of the Generator are trained jointly in the GAN setting. The Discriminator may include a layered architecture as illustrated in the example of FIG. 8.

Training of a Discriminator and a Generator in a GAN setting generally may be based on game theory introducing a minimax rule which is an objective function to solve zero-sum games:

$$\min_G \max_D V(D,G) \quad (2)$$

In the above equation, let V (D, G) denote a value function V of two competing players D and G with each one seeking to increase his gain of this function on the expense of the other. The minimax objective would then be to minimize the maximum gain obtained by player D as according to equation (2).

The Discriminator and the Generator in a GAN setting may accordingly be trained by modelling the objective minimax value function, for example, based on distance-based adversarial loss functions as in a Wasserstein GAN setting, or based on a distance-based divergence loss in terms of finding a support vector machine separating hyperplane between original and fake data feature vectors as in a geometric GAN setting.

In one embodiment, training of the Discriminator and the Generator may respectively be based on one or more loss functions. An example of a Discriminator loss function and an example of a Generator loss function are described by the following equations (3) and (4):

Discriminator Loss:
$$L_D = -\mathbb{E}_{x \sim P_{speech}, y \sim P_{residual}}[\min(0,-1+D(x,y))] - \mathbb{E}_{y \sim P_{residual}}[\min(0,-1-D(G(y),y))] \quad (3)$$

Generator Loss:
$$L_G = \gamma * (\mathbb{E}_{x \sim P_{speech}, y \sim P_{residual}}[\|G(y)-x\|_1]) - (1-\gamma) * \mathbb{E}_{y \sim P_{residual}}[(D(G(y),y))] \quad (4)$$

In the above equations, γ=0.00015 is a regularization multiplier and $\mathbb{E}$ are expectations. In equation (3), the first half of the Discriminator loss function $L_D$ describes the expectation of original (real) samples, i.e. based on distributions P of original speech signals x and corresponding original residuals y. The second half of the Discriminator loss function (3) describes the expectation based on respective fake speech signals G(y) generated by the Generator. In equation (4), the first half of the Generator loss function $L_G$ is a weighted reconstruction loss, whereas the second half is a weighted adversarial loss.

A method for training a Generator in a Generative Adversarial Network setting including the Generator and a Discriminator may include the following steps. A compressed representation of a residual of an original speech signal may be input into the Generator. The residual may be regarded as a noise prior. The Generator may then generate a fake speech signal based on the compressed representation of the residual by feeding it through the encoder part and the decoder part. In a next step, one at a time, the fake speech signal and the compressed residual of the original speech signal, from which the fake speech signal was generated, may be input into the Discriminator. The Discriminator may then judge whether the fake speech signal corresponds to the compressed residual of the original speech signal, i.e. the Discriminator judges the input speech signal to be an original speech signal, or to an undefined compressed residual, i.e. the Discriminator judges the input speech signal to be a fake speech signal. The parameter of the Generator may then accordingly be tuned until the Discriminator can no longer distinguish whether the fake speech signal corresponds to the compressed residual of the original speech signal or the undefined compressed residual.

Interpretation

Unless specifically stated otherwise, as apparent from the following discussions, it is appreciated that throughout the disclosure discussions utilizing terms such as "processing," "computing," "calculating," "determining", "analyzing" or the like, refer to the action and/or processes of a computer or computing system, or similar electronic computing devices, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one example embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The processing system may also encompass a storage system such as a disk drive unit. The processing system in some configurations may include a sound output device, and a network interface device. The memory subsystem thus includes a computer-readable carrier medium that carries computer-readable code (e.g., software) including a set of instructions to cause performing, when executed by one or more processors, one or more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute computer-readable carrier medium carrying computer-readable code. Furthermore, a computer-readable carrier medium may form, or be included in a computer program product.

In alternative example embodiments, the one or more processors operate as a standalone device or may be connected, e.g., networked to other processor(s), in a networked deployment, the one or more processors may operate in the capacity of a server or a user machine in server-user network environment, or as a peer machine in a peer-to-peer or distributed network environment. The one or more processors may form a personal computer (PC), a tablet PC, a Personal Digital Assistant (PDA), a cellular telephone, a web appliance, a network router, switch or bridge, or any machine capable of executing a set of instructions (sequential or otherwise) that specify actions to be taken by that machine.

Note that the term "machine" shall also be taken to include any collection of machines that individually or jointly execute a set (or multiple sets) of instructions to perform any one or more of the methodologies discussed herein.

Thus, one example embodiment of each of the methods described herein is in the form of a computer-readable carrier medium carrying a set of instructions, e.g., a computer program that is for execution on one or more processors, e.g., one or more processors that are part of web server arrangement. Thus, as will be appreciated by those skilled in the art, example embodiments of the present disclosure may be embodied as a method, an apparatus such as a special purpose apparatus, an apparatus such as a data processing system, or a computer-readable carrier medium, e.g., a computer program product. The computer-readable carrier medium carries computer readable code including a set of instructions that when executed on one or more processors cause the processor or processors to implement a method. Accordingly, aspects of the present disclosure may take the form of a method, an entirely hardware example embodiment, an entirely software example embodiment or an example embodiment combining software and hardware aspects. Furthermore, the present disclosure may take the form of carrier medium (e.g., a computer program product on a computer-readable storage medium) carrying computer-readable program code embodied in the medium.

The software may further be transmitted or received over a network via a network interface device. While the carrier medium is in an example embodiment a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present disclosure. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media may also take the form of acoustic or light waves, such as those generated during radio wave and infrared data communications. For example, the term "carrier medium" shall accordingly be taken to include, but not be limited to, solid-state memories, a computer product embodied in optical and magnetic media; a medium bearing a propagated signal detectable by at least one processor or one or more processors and representing a set of instructions that, when executed, implement a method; and a transmission medium in a network bearing a propagated signal detectable by at least one processor of the one or more processors and representing the set of instructions.

It will be understood that the steps of methods discussed are performed in one example embodiment by an appropriate processor (or processors) of a processing (e.g., computer) system executing instructions (computer-readable code) stored in storage. It will also be understood that the disclosure is not limited to any particular implementation or programming technique and that the disclosure may be implemented using any appropriate techniques for implementing the functionality described herein. The disclosure is not limited to any particular programming language or operating system.

Reference throughout this disclosure to "one example embodiment", "some example embodiments" or "an example embodiment" means that a particular feature, structure or characteristic described in connection with the example embodiment is included in at least one example embodiment of the present disclosure. Thus, appearances of the phrases "in one example embodiment", "in some example embodiments" or "in an example embodiment" in various places throughout this disclosure are not necessarily all referring to the same example embodiment. Furthermore, the particular features, structures or characteristics may be combined in any suitable manner, as would be apparent to one of ordinary skill in the art from this disclosure, in one or more example embodiments.

As used herein, unless otherwise specified the use of the ordinal adjectives "first", "second", "third", etc., to describe a common object, merely indicate that different instances of like objects are being referred to and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

It should be appreciated that in the above description of example embodiments of the disclosure, various features of the disclosure are sometimes grouped together in a single example embodiment, Fig., or description thereof for the purpose of streamlining the disclosure and aiding in the understanding of one or more of the various inventive aspects. This method of disclosure, however, is not to be interpreted as reflecting an intention that the claims require more features than are expressly recited in each claim. Rather, as the following claims reflect, inventive aspects lie in less than all features of a single foregoing disclosed example embodiment. Thus, the claims following the Description are hereby expressly incorporated into this Description, with each claim standing on its own as a separate example embodiment of this disclosure.

Furthermore, while some example embodiments described herein include some but not other features included in other example embodiments, combinations of features of different example embodiments are meant to be within the scope of the disclosure, and form different example embodiments, as would be understood by those skilled in the art. For example, in the following claims, any of the claimed example embodiments can be used in any combination.

In the description provided herein, numerous specific details are set forth. However, it is understood that example embodiments of the disclosure may be practiced without these specific details. In other instances, well-known methods, structures and techniques have not been shown in detail in order not to obscure an understanding of this description.

Thus, while there has been described what are believed to be the best modes of the disclosure, those skilled in the art will recognize that other and further modifications may be made thereto without departing from the spirit of the disclosure, and it is intended to claim all such changes and modifications as fall within the scope of the disclosure. For example, any formulas given above are merely representative of procedures that may be used. Functionality may be added or deleted from the block diagrams and operations may be interchanged among functional blocks. Steps may be added or deleted to methods described within the scope of the present disclosure.

What is claimed is:

1. A method of decoding an original speech signal for hybrid adversarial-parametric speech synthesis, wherein the method includes the steps of:
   (a) receiving quantized original linear prediction coding parameters estimated by applying linear prediction coding analysis filtering to an original speech signal and a quantized compressed representation of a residual of the original speech signal;
   (b) dequantizing the original linear prediction coding parameters and the compressed representation of the residual;
   (c) inputting the dequantized compressed representation of the residual into a decoder part of a Generator for applying adversarial mapping from the compressed residual domain to a fake (first) signal domain;
   (d) outputting, by the decoder part of the Generator, a fake speech signal;
   (e) applying linear prediction coding analysis filtering to the fake speech signal for obtaining a corresponding fake residual; and
   (f) reconstructing the original speech signal by applying linear prediction coding cross-synthesis filtering to the fake residual and the dequantized original linear prediction coding analysis parameters.

2. The method according to claim 1, wherein the order used for linear prediction coding analysis filtering in step (e) is the same as the order used for estimating the original linear prediction coding parameters.

3. The method according to claim 1, wherein the Generator is a Generator trained in an Adversarial Network setting including the Generator and a Discriminator, and wherein training of the Generator and the Discriminator is based on one or more of loss functions.

4. The method according to claim 3, wherein the decoder part of the Generator includes an adversarial generation segment including L layers with N filters in each layer, wherein L is a natural number $\geq 1$ and wherein N is a natural number $\geq 1$, wherein the N filters operate with a stride of 2 and the size of the N filters is the same in each of the L layers, and wherein in at least one of the L layers a transposed convolution is performed followed by a gated tanh unit, and wherein an output layer subsequently follows the last of the L layers of the adversarial generation segment, wherein the output layer includes N filters operating with a stride of 1, and wherein a 1D convolution operation is performed in the output layer followed by a tanh operation.

5. The method according to claim 4, wherein the decoder part of the Generator further includes a context decoding segment prior to the adversarial generation segment.

6. The method according to claim 5, wherein the context decoding segment includes L=1 layers with N filters, wherein N is a natural number $\geq 1$, followed by one or more blocks of softmax gated tanh units, wherein the size of the N filters is 1 and the N filters operate with a stride of 1, and wherein a 1D convolution operation is performed in the L=1 layers and wherein the output of the one or more blocks of softmax gated tanh units of the context decoding segment is concatenated with a random noise vector (z).

7. A method of encoding an original speech signal for hybrid adversarial-parametric speech synthesis, wherein the method includes the steps of:
   (a) receiving the original speech signal;
   (b) applying linear prediction coding analysis filtering to the original speech signal for obtaining a corresponding residual;
   (c) inputting the obtained residual into an encoder part of a Generator for encoding the residual;
   (d) outputting, by the encoder part of the Generator, a compressed representation of the residual;
   (e) applying linear prediction coding analysis filtering to the original speech signal for estimating original linear prediction coding parameters; and
   (f) quantizing and transmitting the original linear prediction coding parameters and the compressed representation of the residual, wherein the order used for linear prediction coding analysis filtering in step (e) is higher than in step (b).

8. The method according to claim 7, wherein the order used for linear prediction coding analysis filtering in step (b) is 16 and in step (e) is in a range between 16 to 50.

9. The method according to claim 7, wherein the Generator is a Generator trained in an Adversarial Network setting including the Generator and a Discriminator, and wherein training of the Generator and the Discriminator is based on one or more of loss functions.

10. The method according to claim 9, wherein the encoder part of the Generator includes L layers with N filters in each layer, wherein L is a natural number ≥1 and wherein N is a natural number ≥1, wherein the size of the N filters is the same in each of the L layers and the N filters operate with a stride of 2, and wherein in at least one layer of the L layers, a 1D convolution operation is performed followed by a non-linear operation including one or more of a parametric rectified linear unit (PReLU), a rectified linear unit (ReLU), a leaky rectified linear unit (LReLU), an exponential linear unit (eLU) and a scaled exponential linear unit (SeLU).

11. The method according to claim 10, wherein an output layer subsequently follows the last of the L layers of the encoder part of the Generator, wherein the output layer includes N filters operating with a stride of 1 and wherein a 1D convolution operation is performed in the output layer followed by a non-linear operation including one or more of a parametric rectified linear unit (PRELU), a rectified linear unit (ReLU), a leaky rectified linear unit (LReLU), an exponential linear unit (eLU) and a scaled exponential linear unit (SeLU).

12. An apparatus for encoding an original speech signal for hybrid adversarial-parametric speech synthesis, wherein the apparatus includes:
(a) a receiver for receiving the original speech signal;
(b) a linear prediction coding analysis filter for applying linear prediction coding analysis filtering to the original speech signal for obtaining a corresponding residual;
(c) an encoder part of a Generator configured to receive at an input of the encoder part the obtained residual and to output at an output of the encoder part a compressed representation of the residual, for encoding the residual;
(d) a linear prediction coding analysis filter for applying linear prediction coding analysis filtering to the original speech signal for estimating original linear prediction coding parameters; and
(e) means for quantizing and transmitting the original linear prediction coding parameters and the compressed representation of the residual,
wherein the order used for linear prediction coding analysis filtering in step (d) is higher than the order used for linear prediction analysis filtering in step (b).

13. An apparatus for decoding an original speech signal for hybrid adversarial-parametric speech synthesis, wherein the apparatus includes:
(a) a receiver for receiving quantized original linear prediction coding parameters estimated by applying linear prediction coding analysis filtering to an original speech signal and a quantized compressed representation of a residual of the original speech signal;
(b) means for dequantizing the original linear prediction coding parameters and the compressed representation of the residual;
(c) a decoder part of a Generator for generating a fake speech signal;
(d) a linear prediction analysis filter for applying linear prediction coding analysis filtering to the fake speech signal for obtaining a corresponding fake residual; and
(e) a linear prediction coding synthesis filter for reconstructing the original speech signal by applying linear prediction coding cross-synthesis filtering to the fake residual and the dequantized original linear prediction coding analysis parameters.

* * * * *

UNITED STATES PATENT AND TRADEMARK OFFICE
CERTIFICATE OF CORRECTION

PATENT NO. : 12,254,889 B2
APPLICATION NO. : 17/419047
DATED : March 18, 2025
INVENTOR(S) : Mustafa et al.

Page 1 of 1

It is certified that error appears in the above-identified patent and that said Letters Patent is hereby corrected as shown below:

In the Claims

Column 19, Line 28, Claim 11, delete "(PRELU)," and insert --(PReLU),--

Signed and Sealed this
Twenty-seventh Day of May, 2025

Coke Morgan Stewart
*Acting Director of the United States Patent and Trademark Office*